(12) United States Patent
Villacrés Mesías et al.

(10) Patent No.: US 11,897,426 B2
(45) Date of Patent: Feb. 13, 2024

(54) STORAGE ASSEMBLY FOR A VEHICLE

(71) Applicant: Ford Global Technologies, LLC, Dearborn, MI (US)

(72) Inventors: Diego Fabricio Villacrés Mesías, Cuajimalpa (MX); Jose Nicolas Juarez Espinoza, Cuajimalpa de Morelos (MX); Humberto Memetla Martinez, Portales Sur (MX)

(73) Assignee: Ford Global Technologies, LLC, Dearborn, MI (US)

(*) Notice: Subject to any disclaimer, the term of this patent is extended or adjusted under 35 U.S.C. 154(b) by 185 days.

(21) Appl. No.: 17/527,620

(22) Filed: Nov. 16, 2021

(65) Prior Publication Data

US 2022/0105872 A1    Apr. 7, 2022

Related U.S. Application Data (63) Continuation of application No. 17/060,382, filed on Oct. 1, 2020, now Pat. No. 11,208,047.

(51) Int. Cl.
   *B60R 5/04*    (2006.01)

(52) U.S. Cl.
   CPC .................................. *B60R 5/044* (2013.01)

(58) Field of Classification Search
   CPC .. B60R 5/044; B60R 5/045; F16F 1/17; F16F 1/027
   USPC ........................................................ 296/37.16
   See application file for complete search history.

(56) References Cited

U.S. PATENT DOCUMENTS

| | | | |
|---|---|---|---|
| 5,590,824 A | 1/1997 | Weeks | |
| 6,050,202 A | 4/2000 | Thompson | |
| 6,733,060 B1 | 5/2004 | Pavkov et al. | |
| 7,401,716 B2 | 7/2008 | Svenson et al. | |
| 9,302,627 B1* | 4/2016 | Shahmehri | B60R 5/047 |
| 9,783,116 B2 | 10/2017 | Huebner et al. | |
| 10,787,128 B2 | 9/2020 | Ngo | |

FOREIGN PATENT DOCUMENTS

| | | | |
|---|---|---|---|
| CN | 105818753 A | | 8/2016 |
| DE | 10 2011 087 351 | * | 5/2012 |
| JP | 2001 63478 | * | 3/2001 |
| JP | 2008 168680 | * | 7/2008 |
| JP | 2008 168680 | * | 7/2012 |
| JP | 5115694 B2 | | 1/2013 |

* cited by examiner

*Primary Examiner* — Joseph D. Pape (74) *Attorney, Agent, or Firm* — Vichit Chea; Price Heneveld LLP (57) ABSTRACT

A damper for a vehicle cargo panel includes an adaptor body that has an attachment surface and an engagement surface. A plurality of flexures outwardly extend from the engagement surface of the adaptor body and has a planar extension that is coupled to the engagement surface and a curved end. The plurality of flexures is operable between an extended condition and a compressed condition. A coupling member is disposed on the adaptor body and is configured to couple the adaptor body to said vehicle cargo panel.

19 Claims, 11 Drawing Sheets

STORAGE ASSEMBLY FOR A VEHICLE

CROSS REFERENCE TO RELATED APPLICATION

This application is a continuation and claims priority to U.S. patent application Ser. No. 17/060,382, filed on Oct. 1, 2020, now U.S. Patent No. 11,208,047, and entitled "STORAGE ASSEMBLY FOR A VEHICLE," the entire disclosure of which is incorporated herein by reference in its entirety.

FIELD OF THE DISCLOSURE

The present disclosure generally relates to a storage assembly for a vehicle. More specifically, the present disclosure generally relates to a damper for a storage assembly for a vehicle.

BACKGROUND OF THE DISCLOSURE

Vehicles often have trunk dividers for separating or partitioning a storage area, for example when a panel that lays flat within the trunk. The panel is typically formed from a rigid material that may engage a second rigid material to secure the panel in a selected position.

SUMMARY OF THE DISCLOSURE

According to a first aspect of the present disclosure, a storage assembly for a vehicle includes a rigid retention structure. A cargo panel is operably coupled to and selectively engages the rigid retention structure. The cargo panel has a body that defines at least one aperture on at least one side of the body. At least one damper has an adaptor strip that is disposed within the at least one aperture of the body and a plurality of flexures outwardly extends from the adaptor strip and is operable between a compressed condition and an extended condition. The plurality of flexures are configured to engage the rigid retention structure in the compressed condition.

Embodiments of the first aspect of the disclosure can include any one or a combination of the following features:
- each of the plurality of flexures includes a planar extension and a curved end, wherein each of the plurality of flexures is coupled to the adaptor strip via the planar extension;
- a return angle is defined between each flexure of the plurality of flexures and the rigid retention structure;
- the return angle is approximately 45-degrees;
- an approach angle is defined between each flexure of the plurality of flexures and the adaptor strip;
- the approach angle is approximately 45-degrees;
- the at least one damper has a height of approximately 15-millimeters, wherein each of the plurality of flexures has a thickness of 3.5-millimeters.

According to a second aspect of the present disclosure, a damper for a vehicle cargo panel includes an adaptor body that has an attachment surface and an engagement surface. A plurality of flexures outwardly extend from the engagement surface of the adaptor body and has a planar extension that is coupled to the engagement surface and a curved end. The plurality of flexures is operable between an extended condition and a compressed condition. A coupling member is disposed on the adaptor body and is configured to couple the adaptor body to said vehicle cargo panel.

Embodiments of the second aspect of the disclosure can include any one or a combination of the following features:
- each of the plurality of flexures defines a thickness of approximately 2-millimeters;
- the adaptor body and the plurality of flexures define a height of said damper of approximately 8.5-millimeters;
- each flexure of the plurality of flexures defines an approach angle between the planar extension and the engagement surface of the adaptor body;
- each flexure of the plurality of flexures has a return angle at least partially defined by the curved end of each flexure;
- the return angle is approximately 30-degrees;
- each flexure of the plurality of flexures has a thickness of approximately 2-millimeters.

According to a third aspect of the present disclosure, a cargo panel assembly for a vehicle includes a body defining at least one aperture on at least one side of the body. A damper has an adaptor strip that is disposed within the at least one aperture of the body and a plurality of flexures outwardly extend from the adaptor strip and are operable between a compressed condition and an extended condition. The plurality of flexures are configured to engage a rigid surface of said vehicle in the compressed condition.

Embodiments of the third aspect of the disclosure can include any one or a combination of the following features:
- each flexure of the plurality of flexures includes a planar extension and a curved end;
- each flexure of the plurality of flexures defines an approach angle between the planar extension and the adaptor strip;
- the approach angle of the plurality of flexures is smaller in the compressed condition than the approach angle of the plurality of flexures in the extended condition;
- each flexure of the plurality of flexures defines a return angle between the curved end of each flexure and the rigid surface of said vehicle;
- the return angle is defined between the compressed condition and the extended condition of the plurality of flexures.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
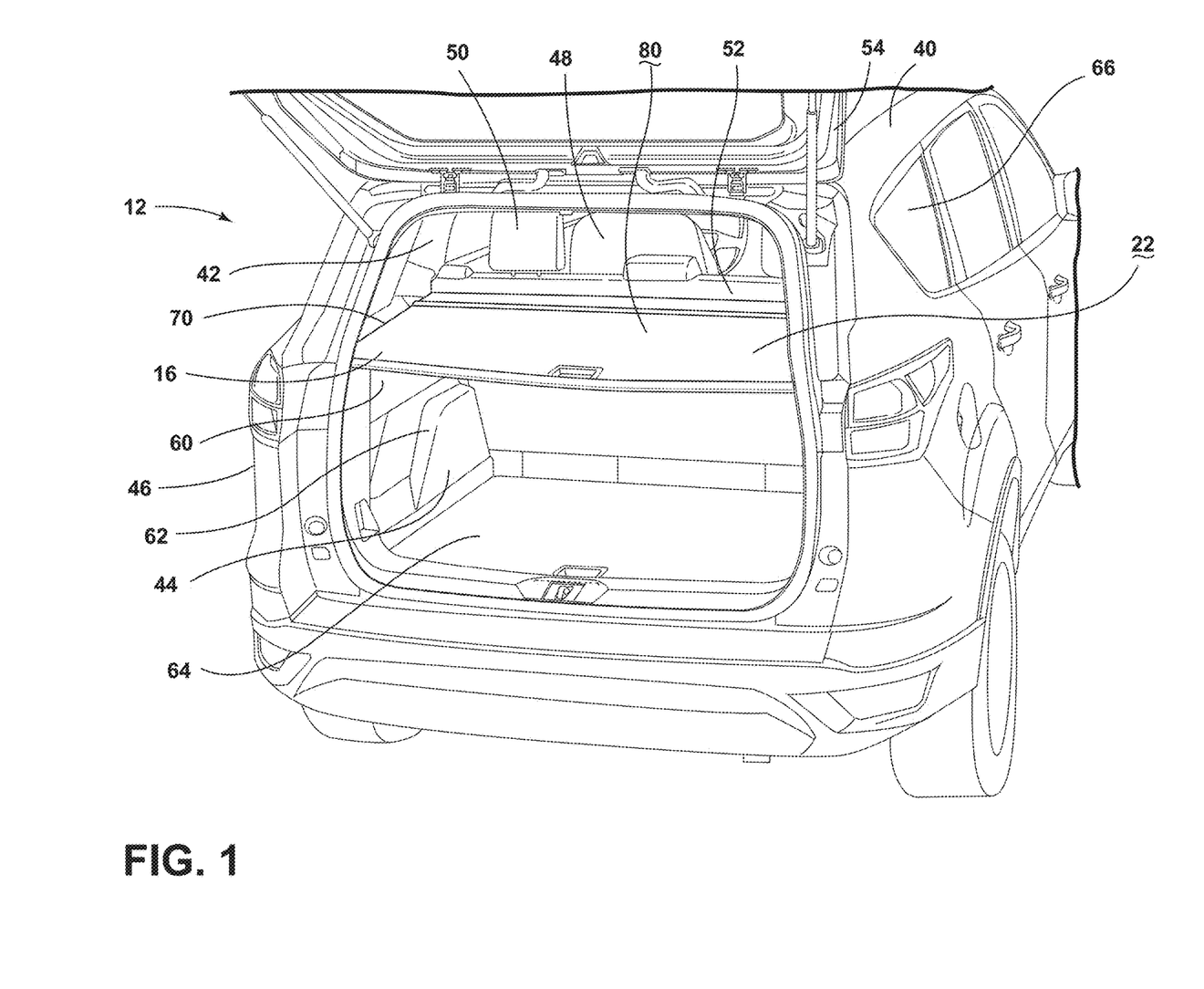
FIG. 1 is a rear perspective view of a cargo space of a vehicle of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, reference number 10 generally refers to a storage assembly for a vehicle 12 that includes a rigid retention structure 14 and a cargo panel 16 operably coupled to and selectively engaging the rigid retention structure 14. The cargo panel 16 has a body 18 that defines at least one aperture 20 on at least one surface 22 of the body 18. At least one damper 24 has an adaptor strip 26 disposed within the at least one aperture 20 of the body 18. The at least one damper 24 also has a plurality of flexures 28 outwardly extending from the adaptor strip 26 and operable between a compressed condition 30 and an extended condition 32. The plurality of flexures 28 are configured to engage the rigid retention structure 14 in the compressed condition 30.

Figure 2:
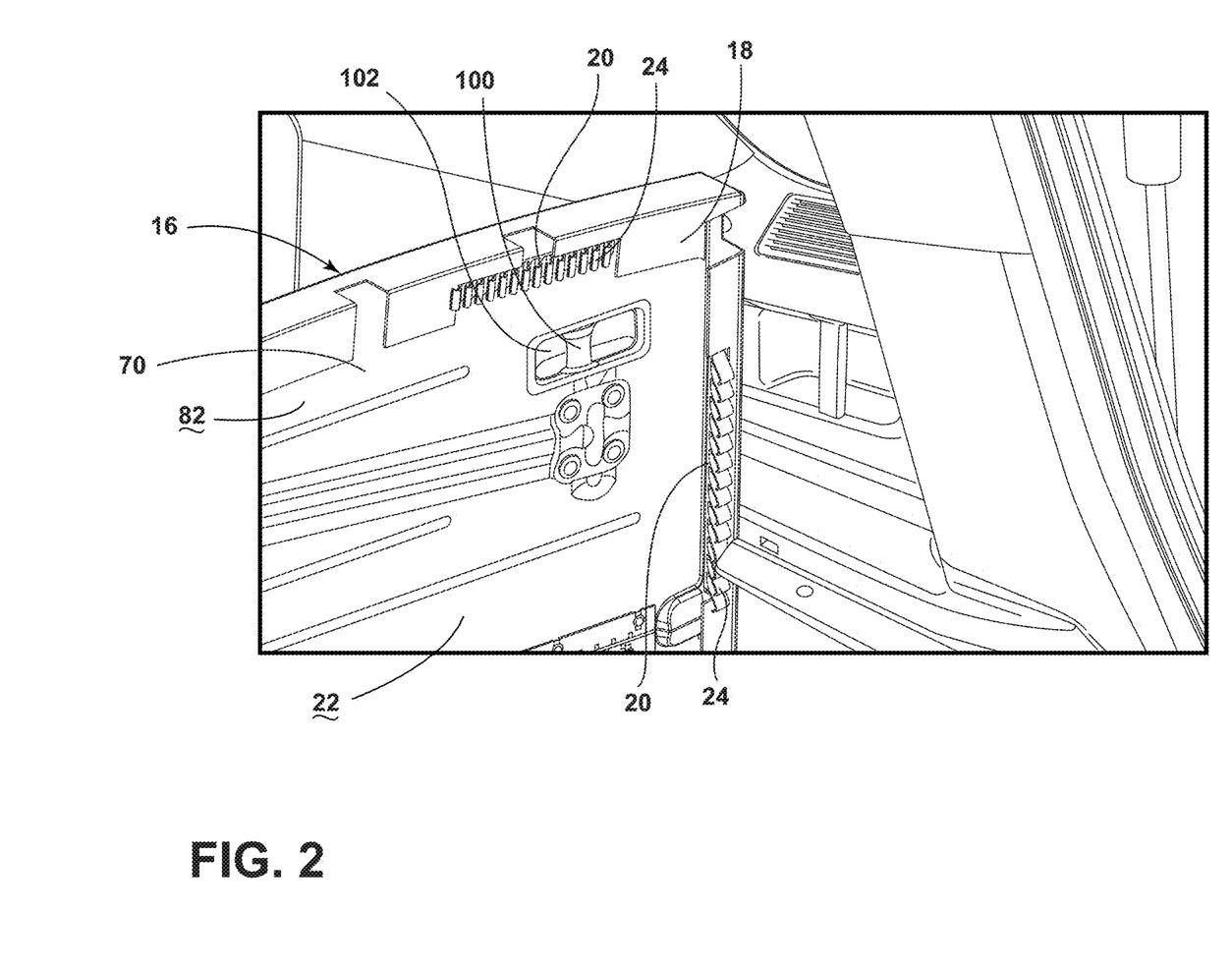
FIG. 2 is a partial enlarged side perspective view of a rigid retention structure of the present disclosure.
Figure 3:
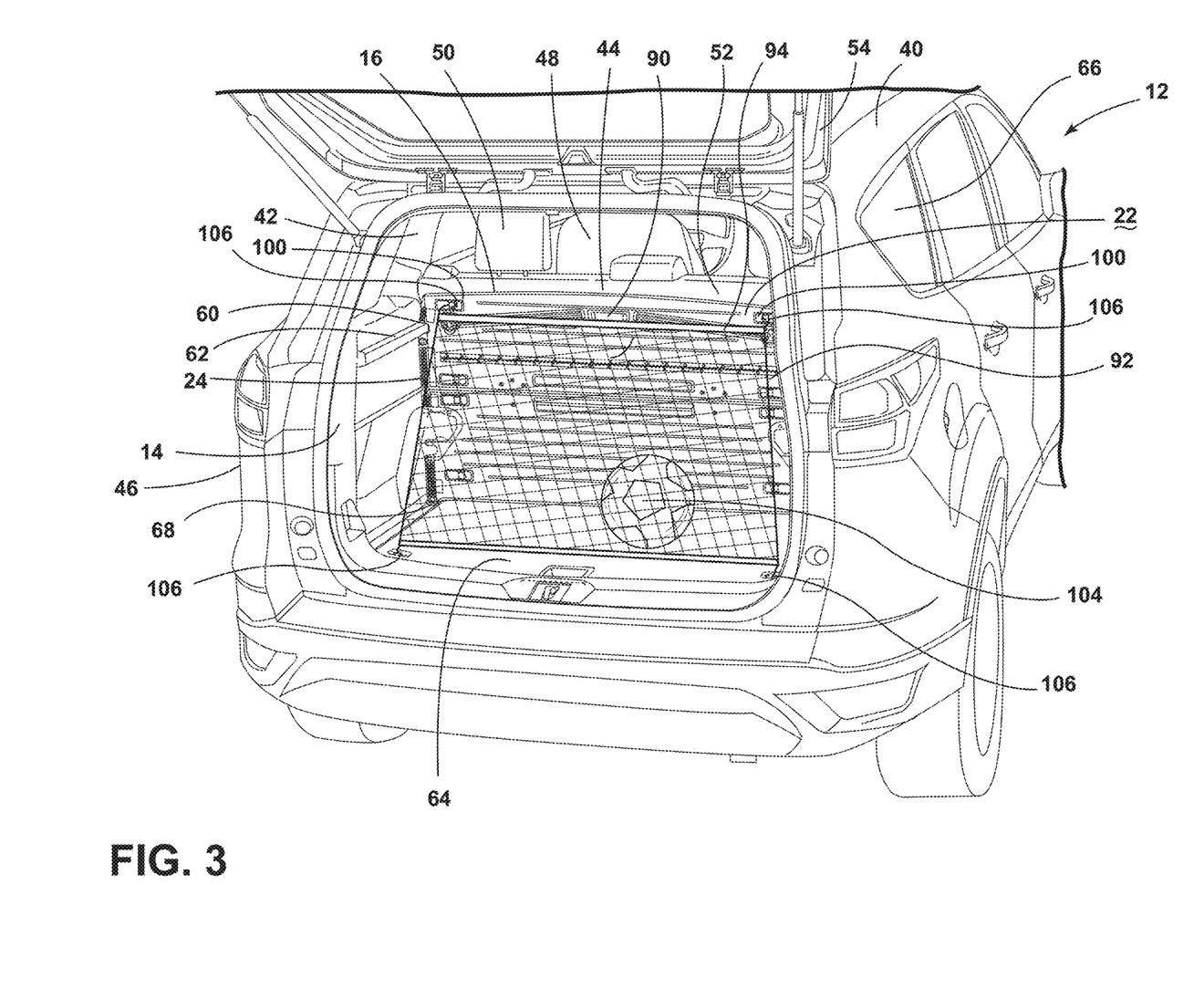
FIG. 3 is a top perspective view of a storage assembly of the present disclosure with a cargo panel and a storage feature.

Referring to FIGS. 1-3, the vehicle 12 includes a vehicle body 40, which defines an interior 42 of the vehicle 12. A cargo space 44 is further defined within the interior 42 of the vehicle 12, such that the cargo space 44 is defined toward a rear portion 46 of the vehicle 12. Stated differently, the cargo space 44 may be referred to as the trunk space of the vehicle 12. The interior 42 of the vehicle 12 may include a first seating row 48 and a second seating row 50. Fewer or more seating rows may be included in the vehicle 12 without departing from the teachings herein. It is generally contemplated that the cargo space 44 may be at least partially defined by a rear seating row 52, illustrated herein as the second seating row 50, and a rear door 54 of the vehicle 12.

In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

With further reference to FIGS. 1-3, the rigid retention structure 14 is defined by sidewalls 60 that also at least partially define the cargo space 44. The rigid retention structure 14 includes ledges 62 outwardly extending from the sidewalls 60 of the vehicle body 40 within the cargo space 44. The ledges 62 may be disposed proximate to a floor surface 64 of the cargo space 44. Additionally or alternatively, the ledges 62 may be disposed proximate to a window 66 or in any location along the sidewalls 60 to provide various height options for the cargo panel 16 within the cargo space 44. The rigid retention structure 14 may also define notches 68 in which the cargo panel 16 may be disposed. It is generally contemplated that the cargo panel 16 is configured to engage the ledges 62 and/or the notches 68 of the rigid retention structure 14 when the cargo panel 16 is in a storage position 70, described in further detail below.

Referring to FIGS. 1-4 and as mentioned above, the body 18 of the cargo panel 16 has at least one surface 22 that defines the at least one aperture 20. It is generally contemplated that the cargo panel 16 of the storage assembly 10 may be referred to as a cargo panel assembly in that the cargo panel 16 includes the at least one damper 24, described further below. The at least one surface 22 of the cargo panel 16 includes a first surface 80 and a second surface 82. The cargo panel 16 also has a first side portion 84 and a second side portion 86 as well as a front portion 88, which may define a handle 90. It is generally contemplated that the first surface 80 may be referred to as a support surface, and the second surface 82 may be referred to as a bracing surface. The support surface 80 is configured to receive items such as boxes, luggage, bags, and other user items. However, the bracing surface 82 may also engage with the user items.

The cargo panel 16 may be positioned horizontally or vertically within the cargo space 44, such that when the cargo panel 16 is in a horizontal orientation 92 the cargo panel 16 is disposed on the ledges 62 of the rigid retention structure 14. Additionally or alternatively, the cargo panel 16 may engage the rigid retention structure 14 within the notches 68 in a vertical orientation 94 of the cargo panel 16. Further, the user items may engage the bracing surface 82 or the support surface 80 of the cargo panel 16 in the vertical orientation 94.

The support surface 80 may include a material that may cushion or otherwise buffer the engagement between the user items and the support service 80. By way of example, not limitation, the support surface 80 may include a fabric layer, which may be formed from a soft material such as felt. It is also contemplated that the support surface 80 may be formed from a hard plastic or other polymeric material, such that the user may place user items on the support surface 80 that may be wet or otherwise be better suited to be positioned on a surface that may be wiped clean. The bracing surface 82 may be formed from the same material as the support surface 80, however, it is generally contemplated that the bracing surface 82 is formed from a rigid polymeric material, such as plastic. It is generally contemplated that the cargo panel 16 may be reversible, such that the first surface 80 may be the bracing surface and the second surface 82 may be the support surface.

Figure 4:
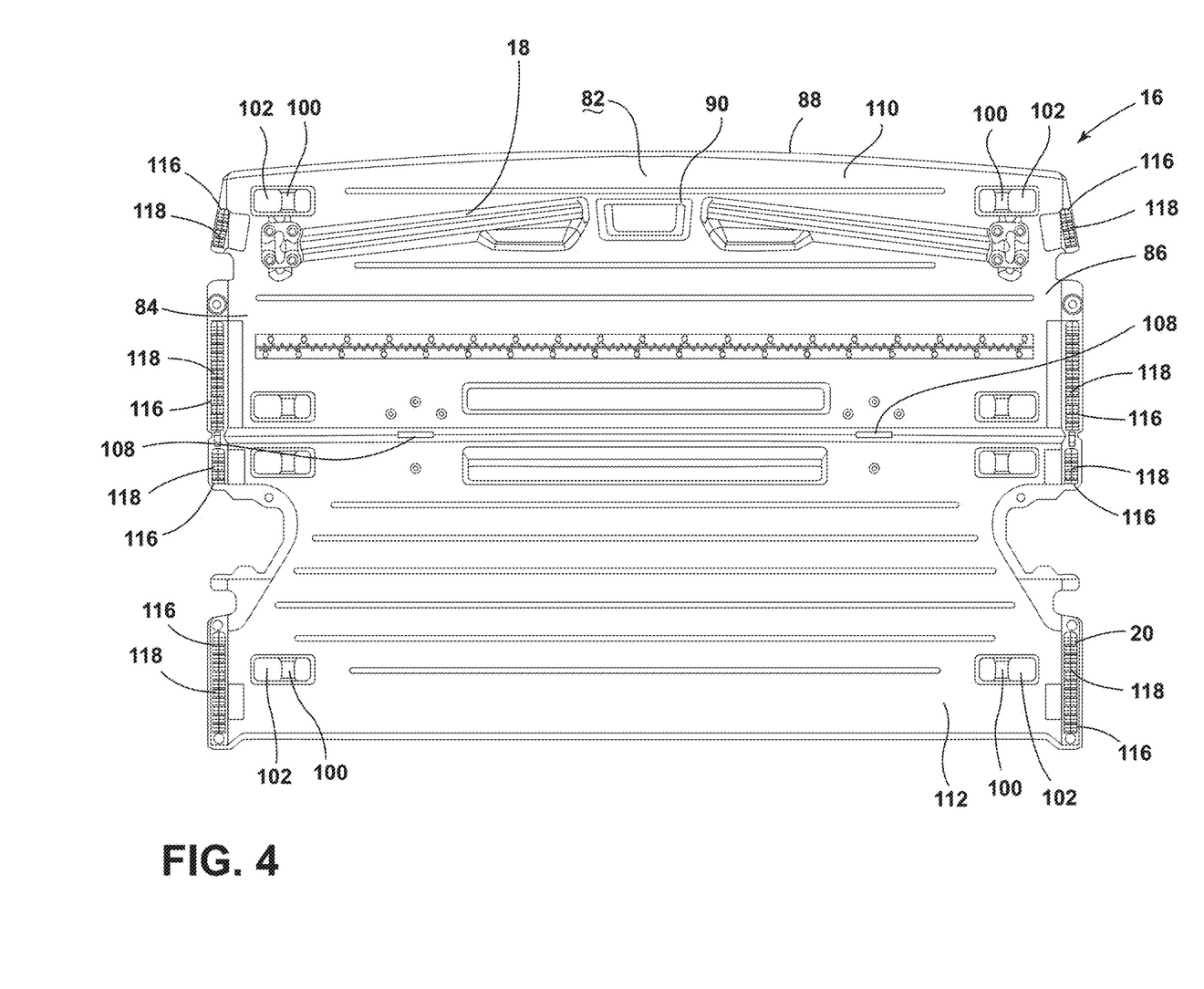
FIG. 4 is a bottom plan view of a cargo panel of the present disclosure having a movable portion and a stationary portion.
Figure 5:
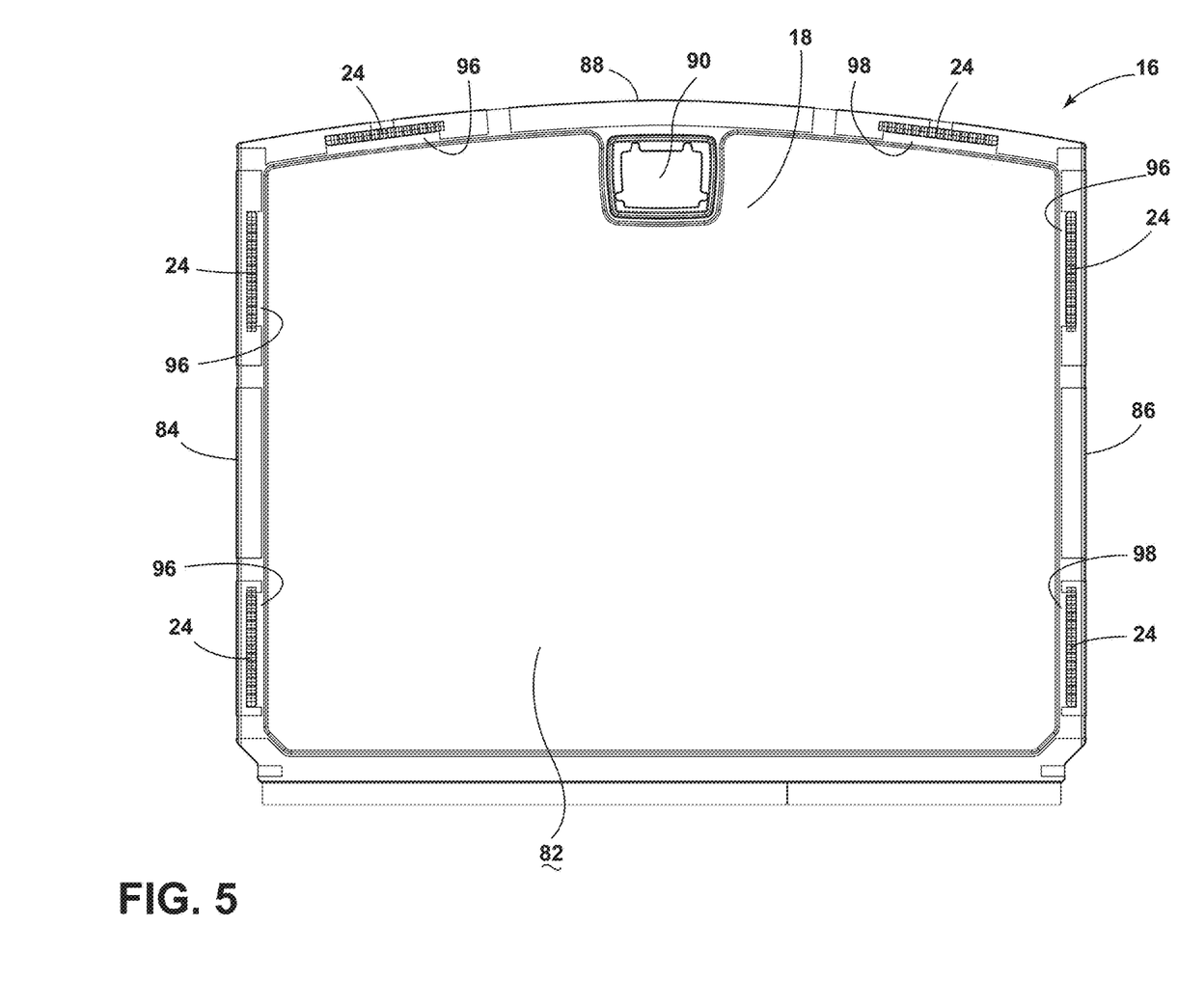
FIG. 5 is a bottom plan view of a cargo panel of the present disclosure.

With further reference to FIGS. 3-5, the at least one aperture 20 is generally defined on the bracing surface 82. By way of example, not limitation, the at least one aperture 20 may include a first aperture 96 and a second aperture 98. The first aperture 96 may be defined on the first side portion 84 of the cargo panel 16, and the second aperture 98 may be defined on the second side portion 86 of the cargo panel 16. Additionally or alternatively, each of the first and second side portions 84, 86 may define both a first aperture 96 and a second aperture 98, such that the second aperture 98 may be proximate to the first aperture 96. As will be described in further detail below, the at least one damper 24 may be disposed within at least one of the first and second apertures 96, 98 defined by the body 18 of the cargo panel 16, regardless of orientation or placement of the first and second apertures 96, 98.

The body 18 of the cargo panel 16 may also include retention bars 100 along either of the first or second surfaces 80, 82. The retention bars 100 may also be disposed in an opening 102 defined in the body 18 of the cargo panel 16, such that a storage feature 104 may be selectively coupled to the retention bars 100 on either the first surface 80 or the second surface 82. The retention bars 100 are configured to retain the storage feature 104 along the cargo panel 16, such that the storage feature 104 may be operably and selectively coupled to the retention bars 100. By way of example, not limitation, the storage feature 104 may be a net that includes attachment features 106, such as hooks, that may couple to the retention bars 100 to couple the storage feature 104 to the cargo panel 16.

With further reference to FIGS. 3-5, it is generally contemplated that the cargo panel 16 may include hinges 108 that operably couple a movable section 110 of the cargo panel 16 to a stationary section 112 of the cargo panel 16. The movable section 110 is defined by the front portion 88 of the cargo panel 16 and may define the handle 90 that a user can grasp to articulate the movable section 110 about the hinges 108. The user may utilize the handle 90 to articulate the movable section 110, such that the movable section 110 may be raised and lowered when the cargo panel 16 is in the horizontal orientation 92.

It is also contemplated that the cargo panel 16 may be a single panel that conceals the floor surface 64 of the cargo space 44. Additionally or alternatively, the cargo panel 16 may partially conceal the floor surface 64, such that the user may access the floor surface 64 with the cargo panel 16 in the storage position 70. Accordingly, the cargo panel 16 may be positioned horizontally within the cargo space 44, such that the cargo panel 16 engages the ledges 62. As mentioned above, the cargo panel 16 may be positioned in the vertical orientation 94 within the cargo space 44, such that the cargo panel 16 engages the notches 68. The at least one damper 24 coupled to the cargo panel 16 is configured to buffer the engagement of the cargo panel 16 and the ledges 62 or the notches 68 of the rigid retention structure 14, as described in further detail below.

With further reference to FIGS. 4-7, the body 18 of the cargo panel 16 defines at least one aperture 20 on at least one surface 22 of the body 18, which may include the first aperture 96 and the second aperture 98 mentioned above. The at least one aperture 20 may also include a plurality of apertures 116 disposed along either the first surface 80 and/or the second surface 82, such that a plurality of dampers 118 may be disposed in the plurality of apertures 116, as illustrated in FIG. 4. By way of example, not limitation, the first and second apertures 96, 98 will be described herein and will be described as each being disposed on the first and second side portions 84, 86 as well as the front portion 88 of the cargo panel 16. It is generally contemplated that the at least one damper 24 may be disposed in each of the first and second apertures 96, 98.

Figure 6:
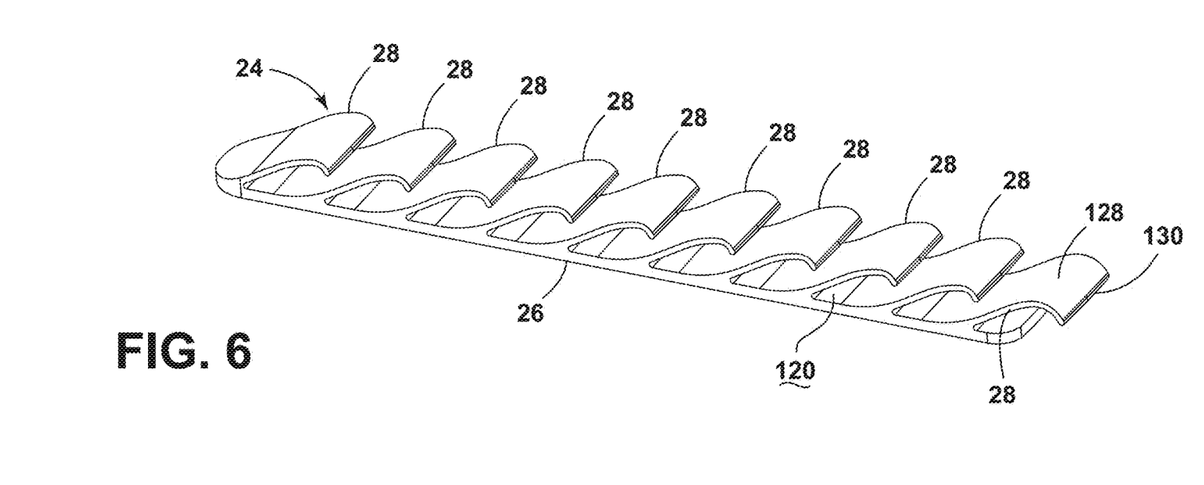
FIG. 6 is a bottom perspective view of a damper of the present disclosure.
Figure 7:
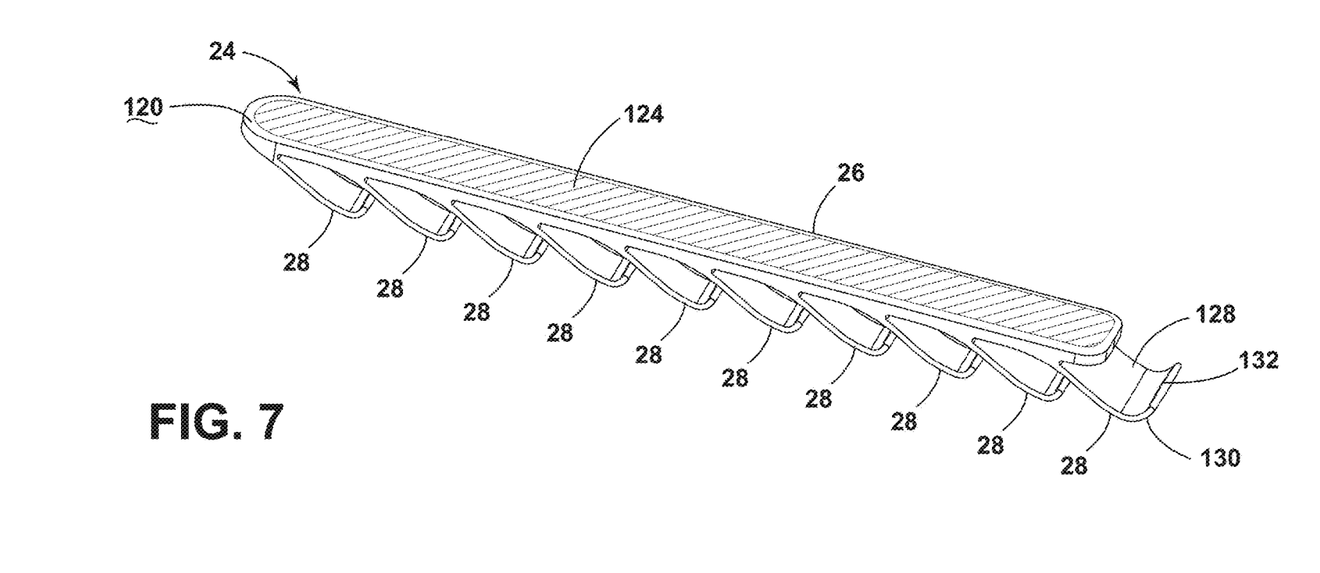
FIG. 7 is a top perspective view of the damper of FIG. 6.
Figure 8:
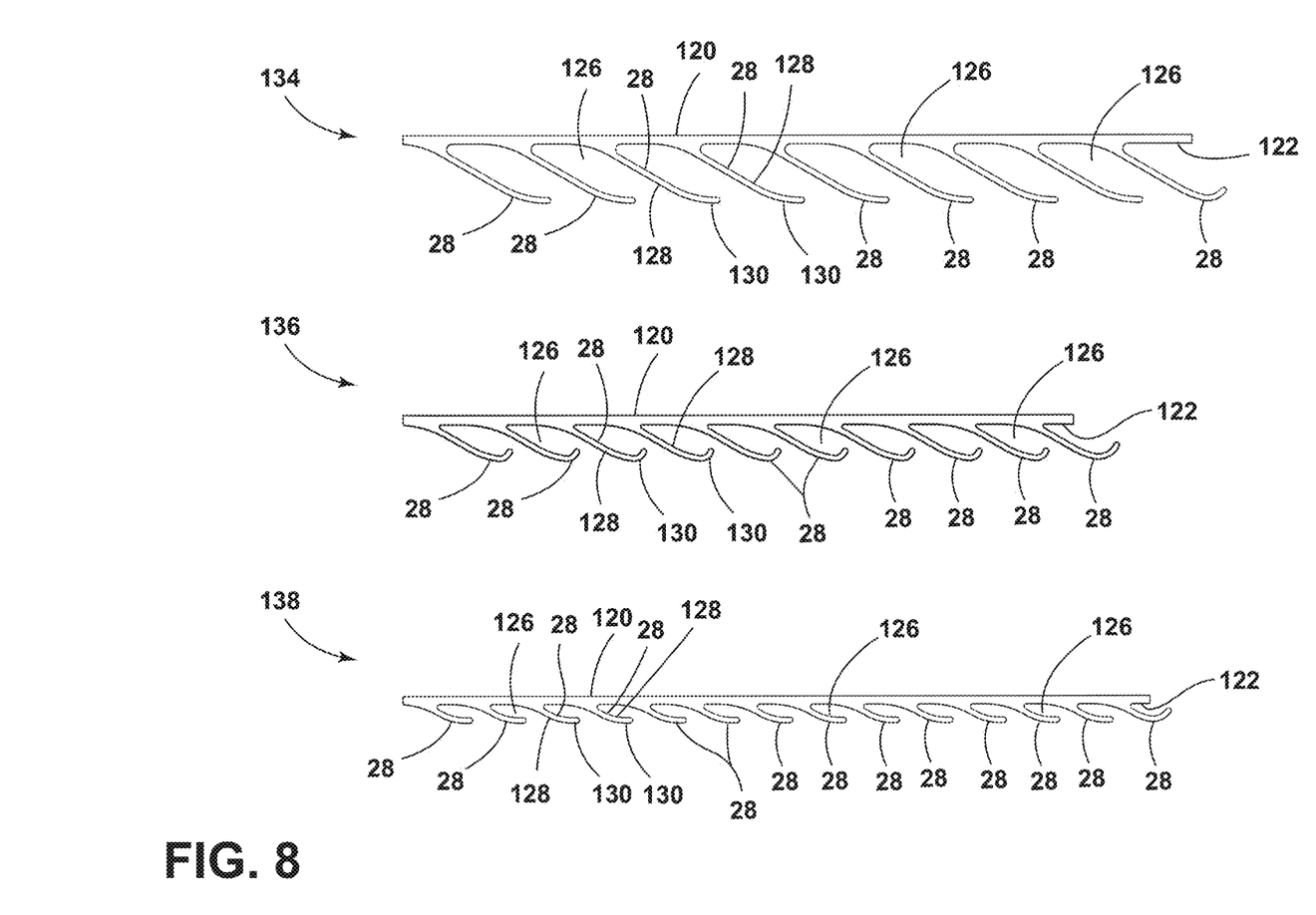
FIG. 8 is a side elevational view of a first damper, a second damper, and a third damper of the present disclosure.

Referring to FIGS. 6-8, the damper 24 includes the adaptor strip 26 and the plurality of flexures 28. The adaptor strip 26 may also be referred to as an adaptor body, such that the adaptor body 26 has an attachment surface 120 and an engagement surface 122. The attachment surface 120 may include a coupling member 124 formed from a fastening material, such as an adhesive, that couples the damper 24 within the respective aperture 20 to the cargo panel 16. While it is generally contemplated that the coupling member 124 may be an adhesive, it is also contemplated that other fastening or coupling materials, such as hook and loop fasteners, may be used to couple the damper 24 to the cargo panel 16. It is generally contemplated that the plurality of flexures 28 are coupled to the adaptor strip 26. The plurality of flexures 28 may be integrally formed with the adaptor strip 26 or may be separately coupled to the adaptor strip 26. A space 126 is defined between each of the flexures 28 and the engagement surface 122 of the adaptor strip 26, such that the flexures 28 may at least partially extend into the space 126 in the compressed condition 30, described further below. Each flexure 28 includes a varying height and thickness depending on the level of compression desired for the damper 24 and/or the location and position of the damper 24.

Additionally, each flexure 28 includes a planar extension 128 and a curved end 130. The planar extension 128 is coupled to the engagement surface 122 of the adaptor strip 26, such that the planar extensions 128 of each flexure 28 defines the space 126, mentioned above. The curved end 130 selectively engages the rigid retention structure 14 on a contact surface 132 of the curved end 130. The contact surface 132 is the portion of the flexure 28 that contacts the rigid retention structure 14. The contact surface 132 may be increased or decreased depending on an anticipated load L that may be placed on the cargo panel 16.

The plurality of flexures 28 also have an approach angle $\alpha$ and a return angle $\beta$. The approach angle $\alpha$ may be defined as the angle taken between the planar extension 128 of the flexure 28 and the engagement surface 122 of the adaptor strip 26. As the flexure 28 is compressed toward the engagement surface 122 the approach angle $\alpha$ may get smaller, described further below. Additionally or alternatively, the approach angle $\alpha$ may be defined between the compressed condition 30 and the extended position 32 of the flexures 28. The return angle $\beta$ may be defined as the angle taken between the curved end 130 of the flexure 28 and the rigid retention structure 14. The return angle $\beta$ defines the longitudinal displacement of the flexures 28 relative to the rigid retention structure 14 between the compressed condition 30 and the extended position 32.

With further reference to FIGS. 8-11, the damper 24 may be configured as at least one of a first damper 134, a second damper 136, and a third damper 138. Each of the first, second, and third dampers 134, 136, 138 include the adaptor strip 26 and the plurality of flexures 28. It is generally contemplated that the first damper 134 may be more flexible than the second or third dampers 136, 138. However, each of the dampers 134, 136, 138 may be adjusted to various flexibilities. Any one or all of the dampers 134, 136, 138 may be coupled to the cargo panel 16, such that the various flexibilities of each may be utilized for different regions of the cargo panel 16, described further below.

Figure 9:
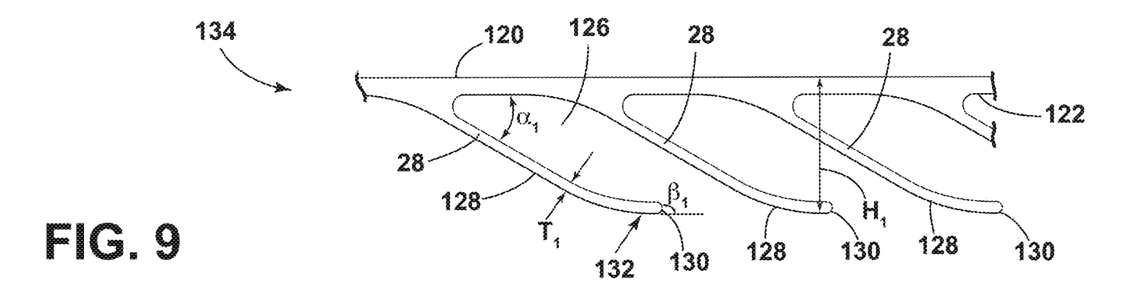
FIG. 9 is a partial side elevational view of a plurality of flexures of a first damper of the present disclosure.

As illustrated in FIG. 9, each flexure 28 of the first damper 134 has a height $H_1$ and a thickness $T_1$. By way of example, not limitation, the height $H_1$ of the flexures 28 of the first damper 134 may range between ten (10) millimeters and fifteen (15) millimeters. It is also contemplated that the height $H_1$ may be less than ten (10) millimeters or greater than fifteen (15) millimeters. As a further example, not limitation, the thickness $T_1$ of the flexures 28 of the first damper 134 may range between one (1) millimeter and four (4) millimeters. However, it is also contemplated that the thickness $T_1$ may be less than one (1) millimeter or greater than four (4) millimeters.

The flexures 28 of the first damper 134 may have an approach angle $\alpha_1$ ranging between 30-degrees and 45-degrees. However, it is also contemplated that the approach angle $\alpha_1$ may be less than 30-degrees or greater than 45-degrees. Additionally, the flexures 28 of the first damper 134 may have a return angle $\beta_1$ ranging between 30-degrees and 60-degrees. For example, the return angle $\beta_1$ may be 45-degrees. The return angle $\beta_1$ may also be less than 30-degrees or greater than 60-degrees depending on the structure of the flexures 28. The approach angle $\alpha_1$ and the return angle $\beta_1$ are dependent on the thickness $T_1$ and the height $H_1$ of the flexures 28. For example, the greater the height $H_1$ of the flexures 28 the more flexible the flexures 28 will be. Additionally, the thinner the thickness $T_1$ of the flexures 28 translates to the flexures 28 being more flexible overall.

Figure 10:
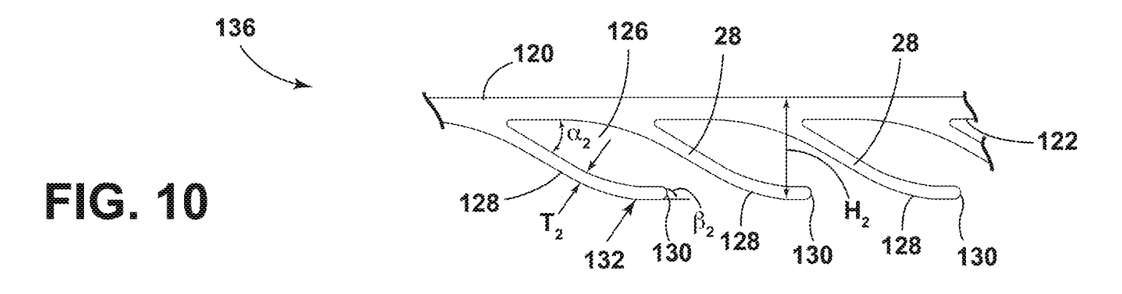
FIG. 10 is a partial side elevational view of a plurality of flexures of a second damper of the present disclosure.

In an alternative configuration illustrated in FIG. 10, the second damper 136 may include flexures 28 having a height $H_2$ ranging between seven (7) millimeters and ten (10) millimeters. It is also contemplated that the height $H_2$ of the flexures 28 may be less than seven (7) millimeters or greater than ten (10) millimeters. By way of example, not limitation, the height $H_2$ may be eight and a half (8.5) millimeters. The flexures 28 of the second damper 136 may also have a thickness $T_2$ ranging between one (1) millimeter and three (3) millimeters. For example, the thickness $T_2$ may be two (2) millimeters. However, it is also contemplated that the thickness $T_2$ may be less than one (1) millimeter or greater than three (3) millimeters. Additionally, the flexures 28 of the second damper 136 may have an approach angle $\alpha_2$ that may range between 30-degrees to 45-degrees, and a return angle $\beta_2$ of the flexures 28 may range between 30-degrees to 60-degrees. For example, the return angle $\beta_2$ may be 30-degrees. The approach angle $\alpha_2$ may also be less than 30-degrees or greater than 45-degrees, and the return angle $\beta_2$ may also be less than 30-degrees or greater than 60-degrees.

Figure 11:
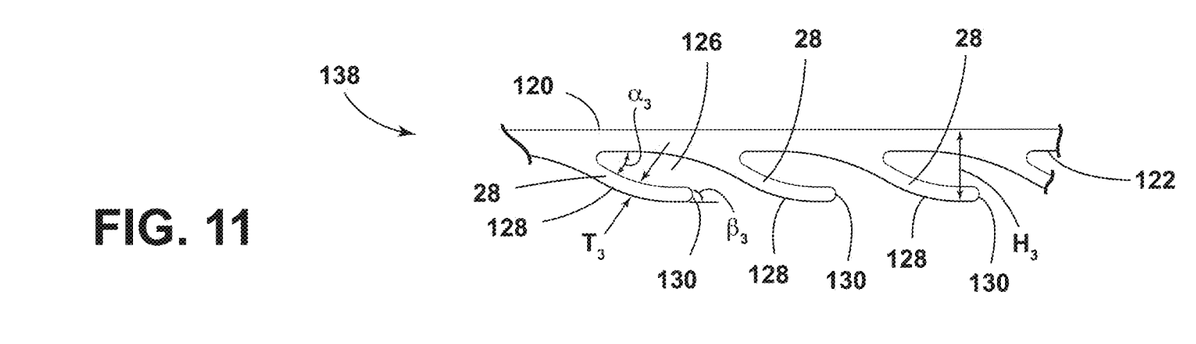
FIG. 11 is a partial side elevational view of a plurality of flexures of a third damper of the present disclosure.

In a further alternate configuration illustrated in FIG. 11, the plurality of flexures 28 of the third damper 138 may have a height $H_3$ ranging between five (5) millimeters to seven (7) millimeters. It is also contemplated that the height $H_3$ the flexures 28 may be less than five (5) millimeters or greater than seven (7) millimeters. Further, each flexure may have a thickness $T_3$ ranging from one (1) millimeter to two (2) millimeters. Additionally, the flexures 28 of the third damper 138 may have an approach angle $\alpha_3$ that may range between 30-degrees and 45-degrees, and a return angle $\beta_3$ that may range between 20-degrees and 45-degrees. However, the approach angle $\alpha_3$ may be less than 30-degrees or greater than 45-degrees, and the return angle $\beta_3$ may be less than 20-degrees or greater than 45-degrees. The approach angle $\alpha_3$ and the return angle $\beta_3$ are dependent on the thickness $T_3$ and the height $H_3$ of the flexures 28. For example, the smaller the height $H_3$ of the flexures 28 the less flexible the flexures 28 will be. Additionally, the thicker the thickness $T_3$ of the flexures 28 translates to the flexures 28 being less flexible overall.

Figure 12:
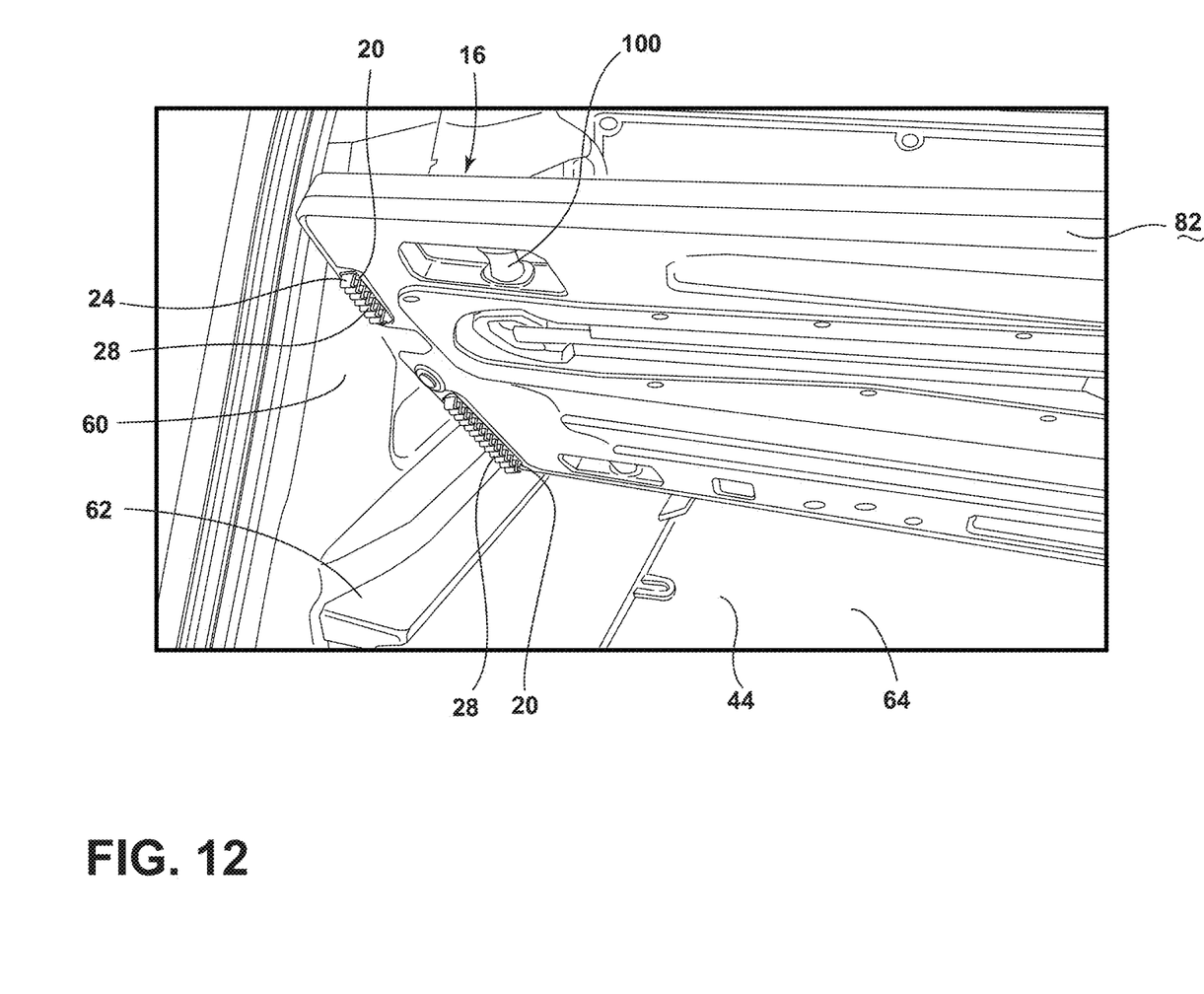
FIG. 12 is a partial rear perspective view of a cargo space of the present disclosure with a cargo panel in a partially raised position.
Figure 13:
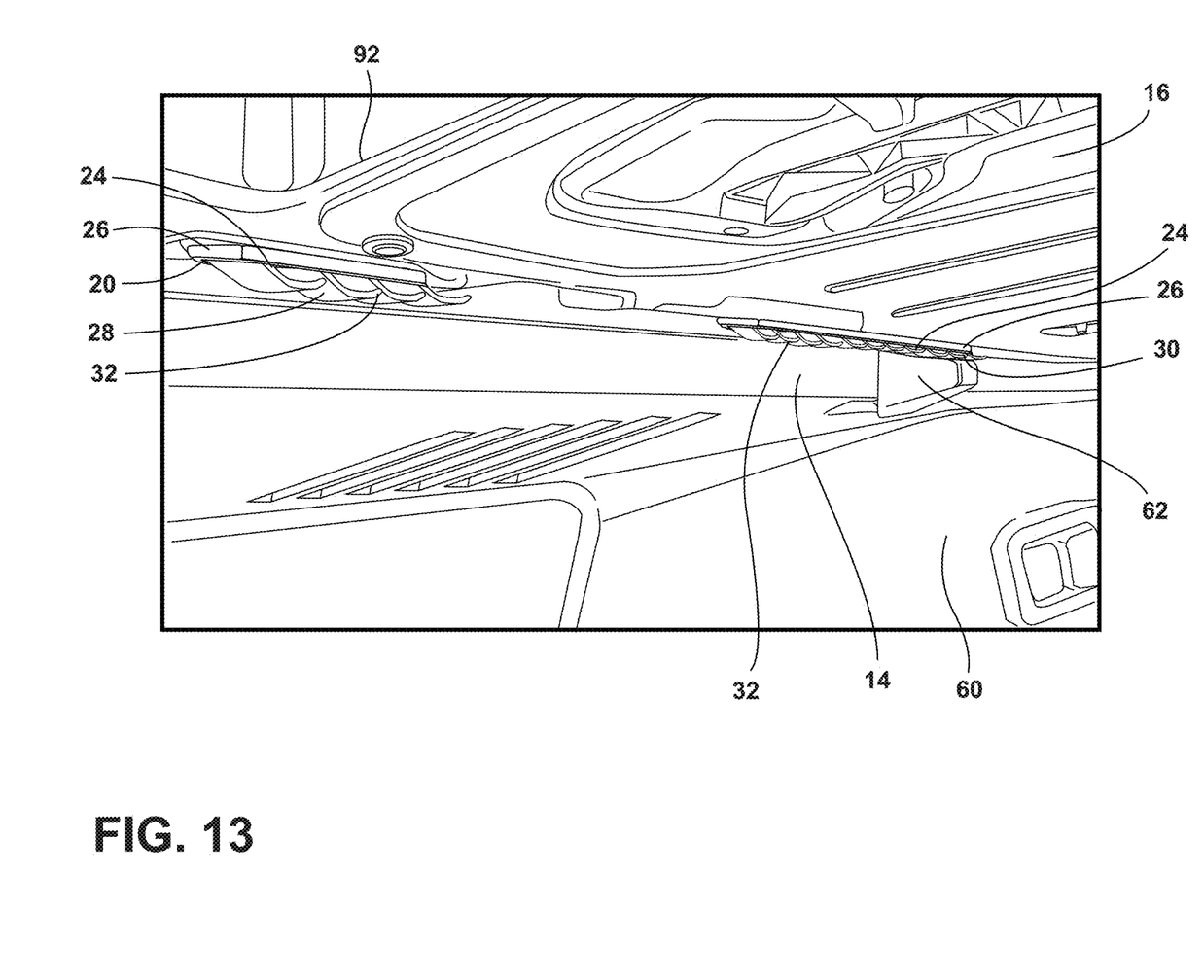
FIG. 13 is a partial bottom perspective view of a cargo panel of the present disclosure in a horizontal orientation.
Figure 14:
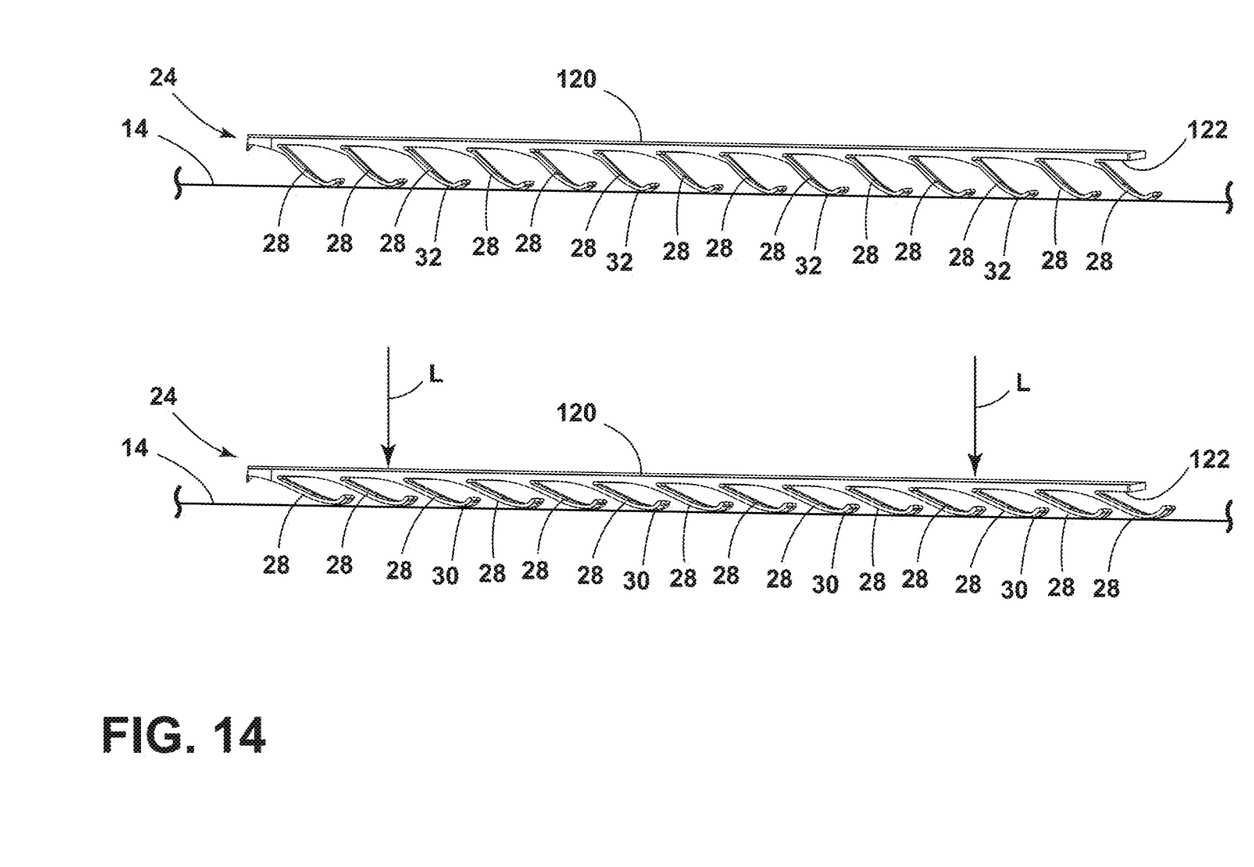
FIG. 14 is a side elevational view of a damper of the present disclosure in an extended condition and a compressed condition.

Referring to FIGS. 12-14, the flexures 28 compress towards the engagement surface 122 of the adaptor strip 26 as the load L is placed on the support surface 80 of the cargo panel 16 when the cargo panel 16 is in the horizontal orientation 92. In the horizontal orientation 92, the cargo panel 16 may rest on the rigid retention structure 14, such that the flexures 28 are in the extended condition 32. The flexures 28 may translate into the compressed condition 30 upon placement of the load L on the cargo panel 16, such as luggage, boxes, and other user items. It is also contemplated that the general movement of the vehicle 12 (FIG. 1) may also result in the compression and extension of the flexures 28 relative to the engagement surface 122 of the adaptor strip 26 and the rigid retention structure 14. For example, the flexures 28 may translate between the extended condition 32 and the compressed condition 30 when the cargo panel 16 is positioned in the vertical orientation 94 relative to the floor surface 64 of the cargo space 44. In such configuration, the flexures 28 may engage the rigid retention structure 14 as the flexures 28 translate between the extended condition 32 and the compressed condition 30. As mentioned above, the compression and extension of the flexures 28 may be defined by the general movement of the vehicle 12 (FIG. 1), such that the cargo panel 16 may move in a forward direction and a rearward direction relative to the vehicle 12 (FIG. 1) engaging the flexures 28 against the rigid retention structure 14.

Referring again to FIGS. 1-14, the storage assembly 10 described herein minimizes the overall noise generation of the cargo panel 16 within the cargo space 44. The damper 24 minimizes potential rattling or other noise that may occur as a result of the engagement between the cargo panel 16 and the rigid retention structure 14. Specifically, the plurality of flexures 28 minimize such rattling by the respective approach angle α and the respective return angle β in addition to the height and thickness of each of the flexures 28, described above. The overall flexibility of the flexures 28 results in a smooth movement of the cargo panel 16 relative to the rigid retention structure 14 as the flexures 28 translate between the compressed condition 30 and the extended condition 32. As mentioned above, the damper 24 may absorb the weight of the load L placed upon or engaging with the cargo panel 16. Additionally or alternatively, the damper 24 minimizes the noise of the cargo panel 16 engaging the rigid retention structure 14 as the cargo panel 16 may translate relative to the movement of the vehicle 12.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage assembly, comprising:
a cargo panel including a movable section and a stationary section, the movable section and the stationary section each defining an aperture;
at least one damper operably coupled to the aperture defined by the movable section of the cargo panel, wherein the at least one damper includes an adaptor strip and a plurality of flexures; and
a coupling member operably coupled to the at least one damper and configured to couple the at least one damper to the cargo panel.

2. The storage assembly of claim 1, wherein the at least one damper includes a first damper and a second damper, and wherein the first damper is coupled to the movable section and the second damper is coupled to the stationary section.

3. The storage assembly of claim 1, wherein a space is defined between each flexure of the plurality of flexures.

4. The storage assembly of claim 3, wherein each flexure of the plurality of flexures includes a planar extension and a curved end, and wherein the planar extension of each flexure defines the space between the plurality of flexures.

5. The storage assembly of claim 1, wherein the plurality of flexures have an approach angle and a return angle.

6. A storage assembly, comprising:
a cargo panel including a movable section and a stationary section, the moveable section and the stationary section each defining an aperture;
at least one damper operably coupled to the aperture defined by the movable section of the cargo panel, wherein the at least one damper includes a first damper, a second damper, and a third damper, and wherein the first damper has greater flexibility relative the second and third dampers; and
a coupling member operably coupled to the at least one damper and configured to couple the at least one damper to the cargo panel.

7. A vehicle cargo panel assembly, comprising:
a rigid retention structure;
an adaptor body proximate the rigid retention structure;
a plurality of flexures operably coupled to the adaptor body and selectively coupled to the rigid retention structure, wherein a height of the plurality of flexures is indirectly proportional to an approach angle and a return angle of each of the plurality of flexures.

8. The vehicle cargo panel assembly of claim 7, wherein the adaptor body has an engagement surface and an attachment surface, and wherein the plurality of flexures are operable between a compressed condition and an extended condition relative to the engagement surface.

9. The vehicle cargo panel assembly of claim 8, further comprising:
a cargo panel defining at least one aperture, wherein the adaptor body is disposed within the at least one aperture via the attachment surface.

10. The vehicle cargo panel assembly of claim 9, wherein the cargo panel has a support surface that selectively receives a load, and wherein the plurality of flexures translate toward the engagement surface of the adaptor strip when the load is disposed on the support surface.

11. The vehicle cargo panel assembly of claim 8, wherein the approach angle is defined between each flexure of the plurality of flexures and the adaptor strip.

12. The vehicle cargo panel assembly of claim 11, wherein the plurality of flexures each include a planar extension and a curved end, and wherein the approach angle is defined between the planar extension of the flexures and the engagement surface of the adaptor strip.

13. The vehicle cargo panel assembly of claim 12, wherein the plurality of flexures define tithe return angle between the curved end and the rigid retention structure.

14. The vehicle cargo panel assembly of claim 7, wherein the plurality of flexures each include a contact surface of a curved end, and wherein the contact surface selectively engages the rigid retention structure in a compressed condition of the plurality of flexures.

15. A damper for a vehicle cargo panel, comprising:
an adaptor strip including an attachment surface and an engagement surface;
a plurality of flexures operably coupled to the adaptor strip and operable between a compressed condition and an extended condition, the plurality of flexures including a planar extension and a curved end, and wherein the curved end is proximate the engagement surface of the adaptor strip in the compressed condition; and
a coupling member operably coupled to the attachment surface of the adaptor strip.

16. The damper of claim 15, wherein each flexure of the plurality of flexures has an approach angle of approximately 45-degrees.

17. The damper of claim 15, wherein each flexure of the plurality of flexures has a return angle of approximately 45-degrees.

18. The damper of claim 15, wherein a space is defined between the plurality of flexures and the engagement surface, and wherein the plurality of flexures extend into the space in the compressed condition.

19. The damper of claim 15, wherein the plurality of flexures have a thickness of less than 1 millimeter, and wherein the thickness of the plurality of flexures defines a flexibility of each of the plurality of flexures.

* * * * *